United States Patent [19]

Shinagawa et al.

[11] Patent Number: 5,937,427
[45] Date of Patent: Aug. 10, 1999

[54] INFORMATION RECORDING APPARATUS AND METHOD CAPABLE OF EFFICIENT ERASE, WRITE AND VERIFY PROCESSES

[75] Inventors: Tatsuo Shinagawa; Yutaka Ogasawara, both of Yokohama, Japan

[73] Assignee: Canon Kabushiki Kaisha, Tokyo, Japan

[21] Appl. No.: 08/892,062

[22] Filed: Jul. 14, 1997

Related U.S. Application Data

[63] Continuation of application No. 08/473,934, Jun. 7, 1995, abandoned.

[30] Foreign Application Priority Data

| Jun. 10, 1994 | [JP] | Japan | 6-128772 |
| Mar. 31, 1995 | [JP] | Japan | 7-074906 |
| Jun. 7, 1995  | [JP] | Japan | 7-140611 |

[51] Int. Cl.⁶ ........................................ G06F 12/00
[52] U.S. Cl. .................. 711/113; 711/167; 711/154; 711/138
[58] Field of Search ........................ 711/111, 112, 113, 711/167, 154, 138; 360/53

[56] References Cited

U.S. PATENT DOCUMENTS

| 3,860,958 | 1/1975  | Hanson           | 360/57     |
| 4,494,157 | 1/1985  | Ina et al.       | 360/48     |
| 4,533,995 | 8/1985  | Christian et al. | 395/250    |
| 4,536,836 | 8/1985  | Dodd et al.      | 395/440    |
| 5,134,563 | 7/1992  | Tayler et al.    | 395/250    |
| 5,146,578 | 9/1992  | Zangenehpour     | 395/464    |
| 5,161,072 | 11/1992 | Ai               | 360/53     |
| 5,184,341 | 2/1993  | Hamasaka et al.  | 369/54     |
| 5,187,778 | 2/1993  | Yamamoto et al.  | 395/250    |
| 5,239,424 | 8/1993  | Hasegawa et al.  | 360/53     |
| 5,257,248 | 10/1993 | Ogasawara        | 369/32     |
| 5,418,929 | 5/1995  | Tsuboi et al.    | 395/497.02 |
| 5,522,055 | 5/1996  | Kamanaka et al.  | 395/440    |
| 5,550,998 | 8/1996  | Willis et al.    | 395/441    |

OTHER PUBLICATIONS

Menon et al., "The IBM 3990 Disk Cache", Mar. 1993, COMPCON Spring 88, Thirty–Third IEEE Computer Society International Conference, pp. 146–151.

*Primary Examiner*—Eddie P. Chan
*Assistant Examiner*—Hong Kim
*Attorney, Agent, or Firm*—Fitzpatrick, Cella, Harper & Scinto

[57] ABSTRACT

In recording of information, upon reception of a write request from a host computer, recording information from the host computer is stored in a cache memory, and thereafter, a notification of write completion is transferred to the host computer to accept the next request. A request from the host computer is compared with a most recent prior request so as to judge if two requests are sequential write accesses. When it is determined that the two requests are sequential write accesses, a write operation corresponding to the next write access is sequentially performed after a write operation corresponding to the most recent prior request.

8 Claims, 11 Drawing Sheets

INFORMATION RECORDING APPARATUS AND METHOD CAPABLE OF EFFICIENT ERASE, WRITE AND VERIFY PROCESSES

This application is a continuation of application Ser. No. 08/473,934 filed Jun. 7, 1995, now abandoned.

BACKGROUND OF THE INVENTION

1. Field of the Invention

The present invention relates to an information recording apparatus and method for recording information on an information recording medium such as an optical disc.

2. Related Background Art

In a conventional information recording apparatus (to be simply referred to as a disc apparatus hereinafter), the following access control is executed to achieve a high-speed read operation. That is, data read out from a disc is temporarily stored in a cache memory. When the same data is accessed in the next read operation, data stored in the memory is transferred without accessing to the disc. Also, data written in the disc apparatus is stored in the cache memory to achieve high-speed data transfer. When such a cache memory is used, the disc apparatus has information of data stored in the cache memory, i.e., a table for managing the cache. Upon input/output of data, data access control is executed by looking up this management table.

As a write method using a cache memory, several methods such as a write-through method, a write-back method, and the like are known. In the write-through method, when a certain file (data) is written in a disc in response to a command from a host computer, the file is stored in a cache memory, and is simultaneously written in the disc. In the write-back method, when data from a host computer is stored in a cache memory, the completion of the write access is notified to the host computer, thereby shortening the write time.

Also, the following method (delay write) is known. In this method, the notification of write completion is made to a host computer upon storage of data in a cache memory as in the write-back method, but data write in a disc begins when the disc apparatus is disconnected from the host computer. Also, in terms of the data input/output relationship between the host computer and the disc apparatus, it is known that most data input/output requests from the host computer are those (sequential accesses) for a portion with continuous addresses assigned to the disc.

Figure 1:
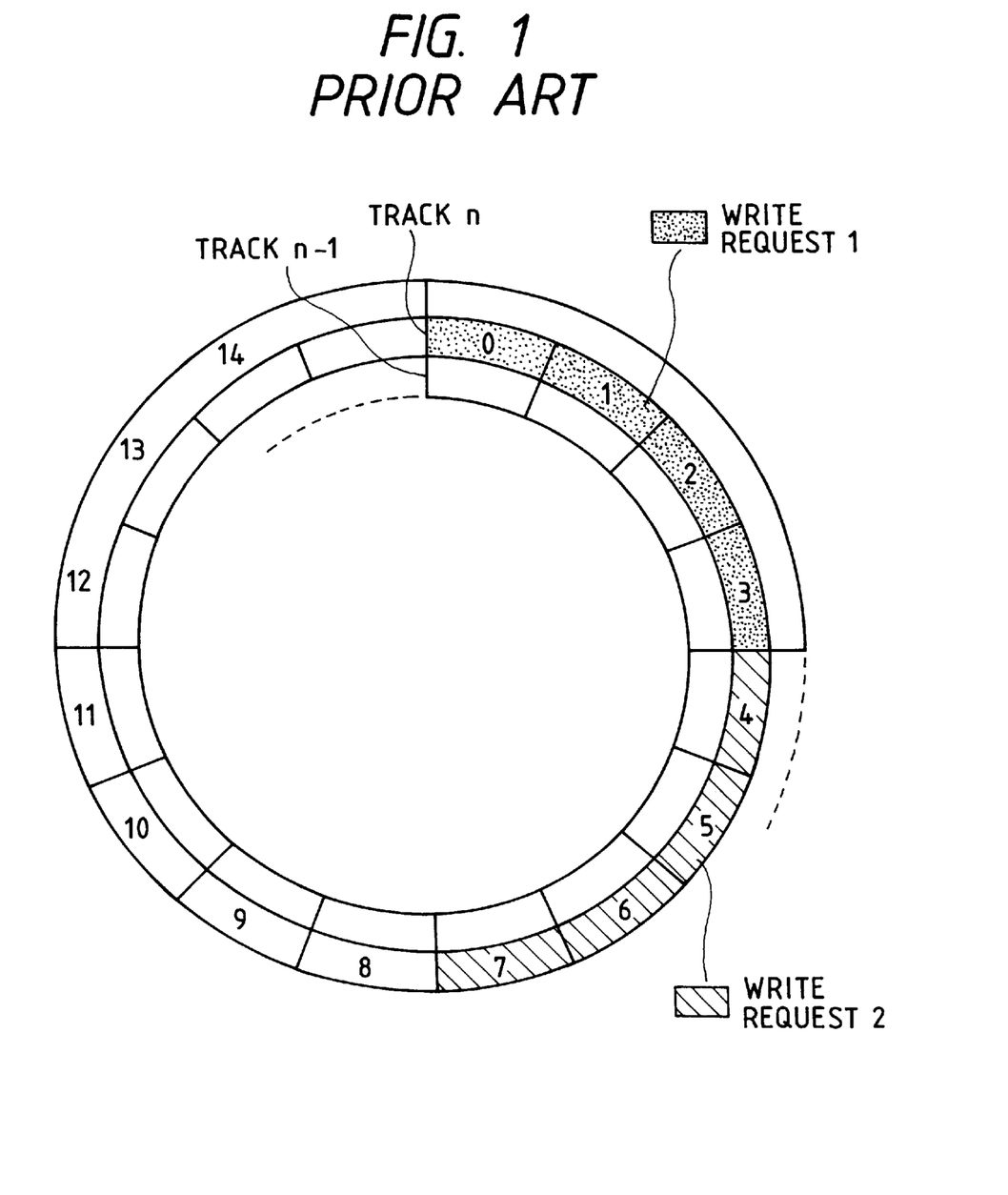
FIG. 1 is a plan view showing the recording surface of a magneto-optical disc.

A conventional sequential write operation will be described below with reference to FIGS. 1 and 2. FIG. 1 is a plan view showing the recording surface of a magneto-optical disc. On the magneto-optical disc shown in FIG. 1, spiral tracks are formed, and one track is constituted by 16 sectors.

Figure 2:
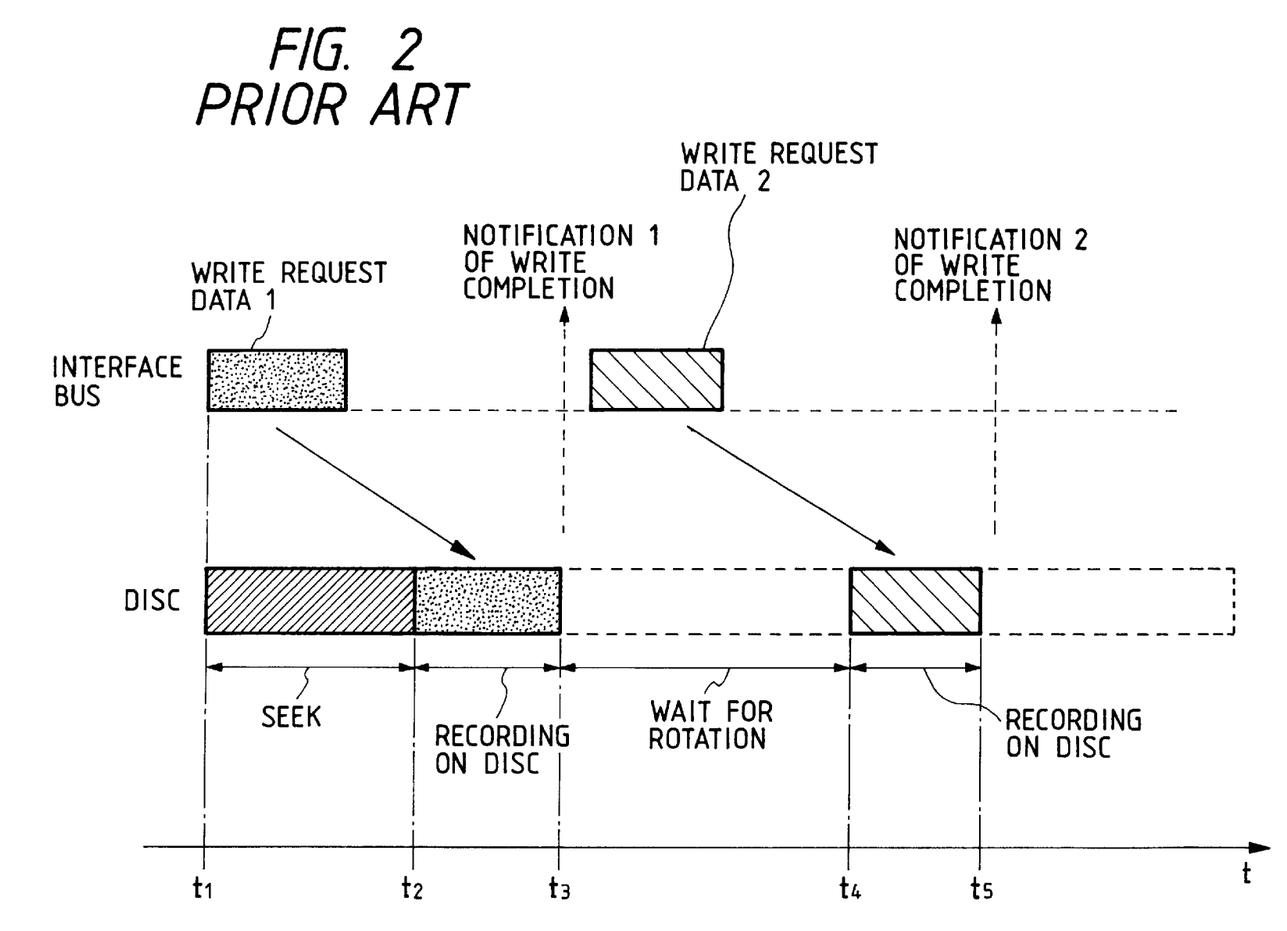
FIG. 2 is an explanatory view showing the time sequence of a conventional information recording operation.

FIG. 2 is a chart showing the time sequence of the state of an interface bus between the host computer and a drive apparatus and the access state to a disc in the drive apparatus. A case will be explained below wherein the host computer issues write request 1 from sector 0 to sector 3 on a track n, and write request 2 from sector 4 to sector 7 thereof to the drive apparatus. At time $t_1$, the host computer starts data transfer of write request 1, and at the same time, the drive apparatus performs a seek operation for moving the recording/reproduction head to sector 9 on the target track n. At time $t_2$, the head reaches sector 0 on the track n in FIG. 1, and starts recording. Upon completion of recording up to sector 3 at time $t_3$, notification 1 of write completion is sent back to the host computer.

The host computer subsequently transfers data of write request 2 from sector 4 to sector 7 on the track n in FIG. 1. However, at this time, since the recording/reproduction head of the drive apparatus has already passed the sector 4, the recording/reproduction head 1 must be moved to a position one track before so as to execute write request 2. For this purpose, the drive apparatus waits for rotation of the disc, and starts recording at time $t_4$. Upon completion of recording at time $t_5$, notification 2 of write completion is sent back to the host computer.

However, in the conventional write method, when sequential write requests are issued to the disc apparatus, the notification of write completion is sent back to the host computer after each body of data is recorded on a disc. For this reason, when the next continuous data is to be recorded on the disc, the disc apparatus must wait for rotation of the disc. For this reason, when a continuous portion is to be recorded, a very long write time is required. In the conventional write-through method, data is written in both the cache memory and the disc, and upon completion of both write operations, the notification of write completion is sent back to the host computer. For this reason, the actual write time is substantially equal to that in a method using no disc cache. Thus, the high-speed characteristics of the cache memory are not utilized.

Furthermore, in the write-back method, although high-speed data transfer is attained using the cache memory, no special means for sequential write requests is adopted, and each write processing must be performed after given rotation wait time. The write-back method must have management information (e.g., request addresses, cache memory addresses, capacity, and the like) of data stored in the cache memory, and must search for and update the management information upon execution of new write processing. In addition, since the write-back method processes data with an arbitrary length at arbitrary addresses, buffer management is complicated. As a result, the search processing time for determining whether or not a request block is stored in the cache buffer in response to a write command, and the processing time for updating management information after the write processing (e.g., detection of the written block) are undesirably prolonged. Furthermore, since read processing, which is not related to the write-back method, requires search processing for determining whether or not a request block is stored in the cache buffer, the search processing time is directly added as an overhead of a command if a cache hit does not occur, thus delaying the command execution time.

SUMMARY OF THE INVENTION

The present invention has been made in consideration of the conventional problems, and has as its object to provide an information recording apparatus and method, which can eliminate the wasteful waiting time upon movement of a recording medium and the processing time required for searching for and updating management information, and can shorten the execution time of information recording.

In order to achieve the above object, there is provided an information recording apparatus, which comprises:

a cache memory for storing recording information transferred from a host computer; and recording means for recording the recording information on a recording medium, and which, upon reception of a write request from the host computer, stores the recording information from the host computer in the cache memory, transfers a notification of write completion to the host computer, and accepts the next request, comprising:

judging means for comparing a request from the host computer with a most recent prior request to judge if two requests are sequential write accesses, wherein when the judging means determines that the two requests are sequential write accesses, a write operation corresponding to the next write access is sequentially performed after a write operation corresponding to the most recent prior request.

In order to achieve the above object, there is also provided an information recording method, in which upon reception of a write request from a host computer, recording information from the host computer is stored in a cache memory, and thereafter, a notification of write completion is transferred to the host computer to accept the next request, comprising:

the judging step of comparing a request from the host computer with a most recent prior request to judge if two requests are sequential write accesses; and the step of sequentially performing a write operation corresponding to the next write access after a write operation corresponding to the most recent prior request when it is determined in the judging step that the two requests are sequential write accesses.

The above and other objects will become apparent from the following description of the embodiments.

BRIEF DESCRIPTION OF THE DRAWINGS

FIG. 5, which includes FIGS. 5A and 5B, is a flow chart showing command processing and data transfer processing with a host computer in the embodiment shown in FIG. 3;

DETAILED DESCRIPTION OF THE PREFERRED EMBODIMENTS

Figure 3:
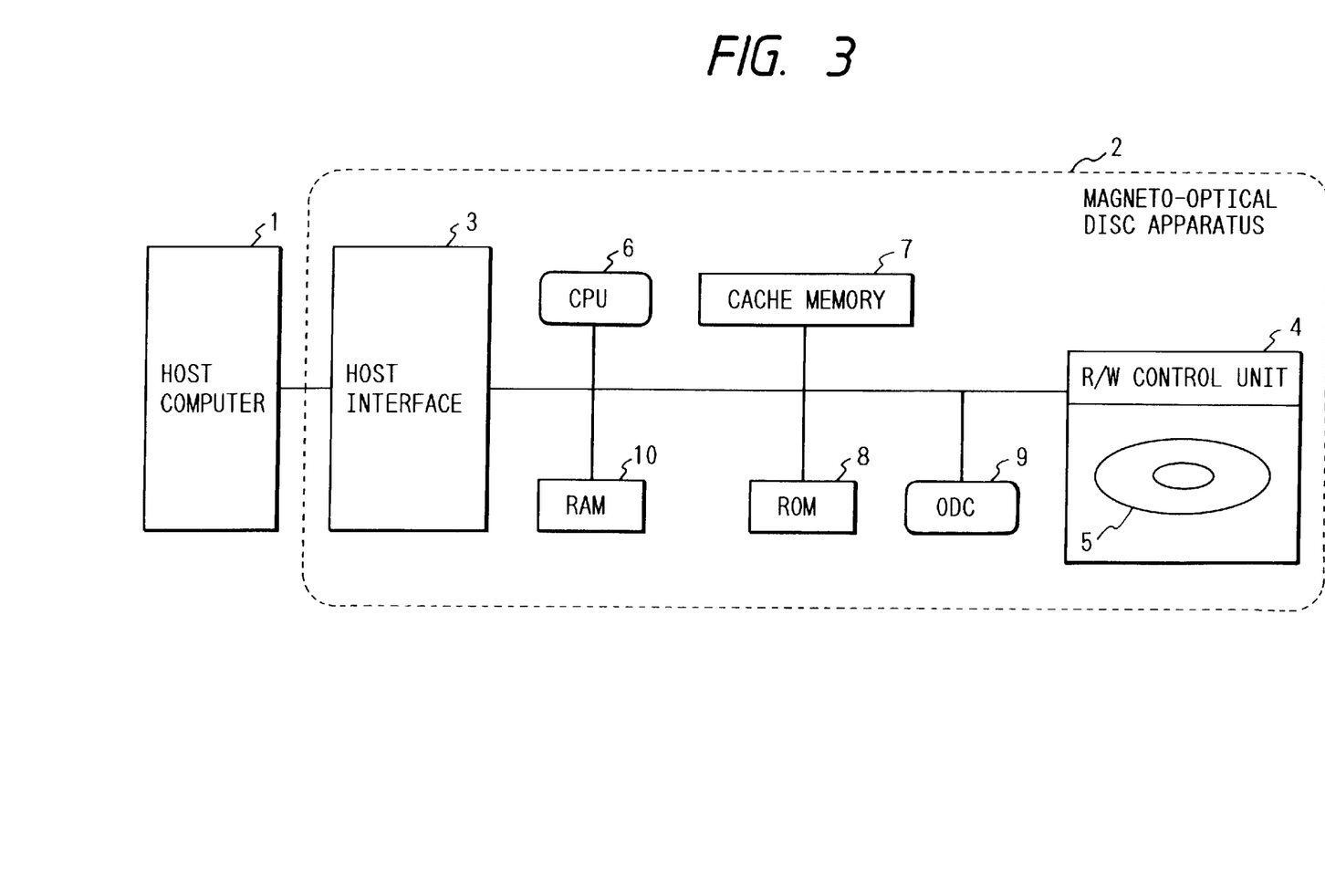
FIG. 3 is a block diagram showing an embodiment of an information recording apparatus according to the present invention.

The preferred embodiments of the present invention will now be described in detail with reference to the accompanying drawings. FIG. 3 is a block diagram showing an embodiment of an information recording apparatus according to the present invention. FIG. 3 exemplifies a magneto-optical disc apparatus as an information recording apparatus. In this embodiment, the magneto-optical disc apparatus is connected, as an external storage apparatus, to a host computer. Referring to FIG. 3, a host computer 1 is a host control apparatus for a magneto-optical disc apparatus 2 of this system, and the magneto-optical disc apparatus 2 performs information recording and reproduction in response to recording and reproduction requests from the host computer 1. A host interface 3 serves as an interface unit between the host computer 1 and the magneto-optical disc apparatus 2.

An R/W control unit 4 is a driving control unit for a magneto-optical disc drive, and controls recording and reproduction to and from a magneto-optical disc (to be simply referred to as a disc hereinafter) 5. The R/W control unit operates in response to a command from a CPU 6. The CPU 6 is a processor circuit which serves as the core of the magneto-optical disc apparatus 2 and controls the entire apparatus. More specifically, the CPU 6 executes processing via the host interface 3 in response to a request from the host computer 1, instructs the R/W control unit 4, and controls a cache memory 7. A ROM 8 is a memory for storing a micro-program for controlling the entire magneto-optical disc apparatus 2. An ODC 9 is a magneto-optical disc control unit, which performs data transfer between the interface 3 and the cache memory 7, data transfer between the cache memory 7 and the R/W control unit 4, and addition of an error correction code and error correction.

The ODC 9 has a function of storing a plurality of commands from the CPU 6 and sequentially executing the stored command, and a function of simultaneously executing data transfer between the interface 3 and the cache memory 7 and data transfer between the cache memory 7 and the R/W control unit 4 in response to the command. A RAM 10 is a memory for storing the contents of requests from the host computer 1. For example, the RAM 10 stores type data of a write or read request, the recording addresses of data on the disc when a request from the host computer 1 is a write request, and the like.

Figure 4:
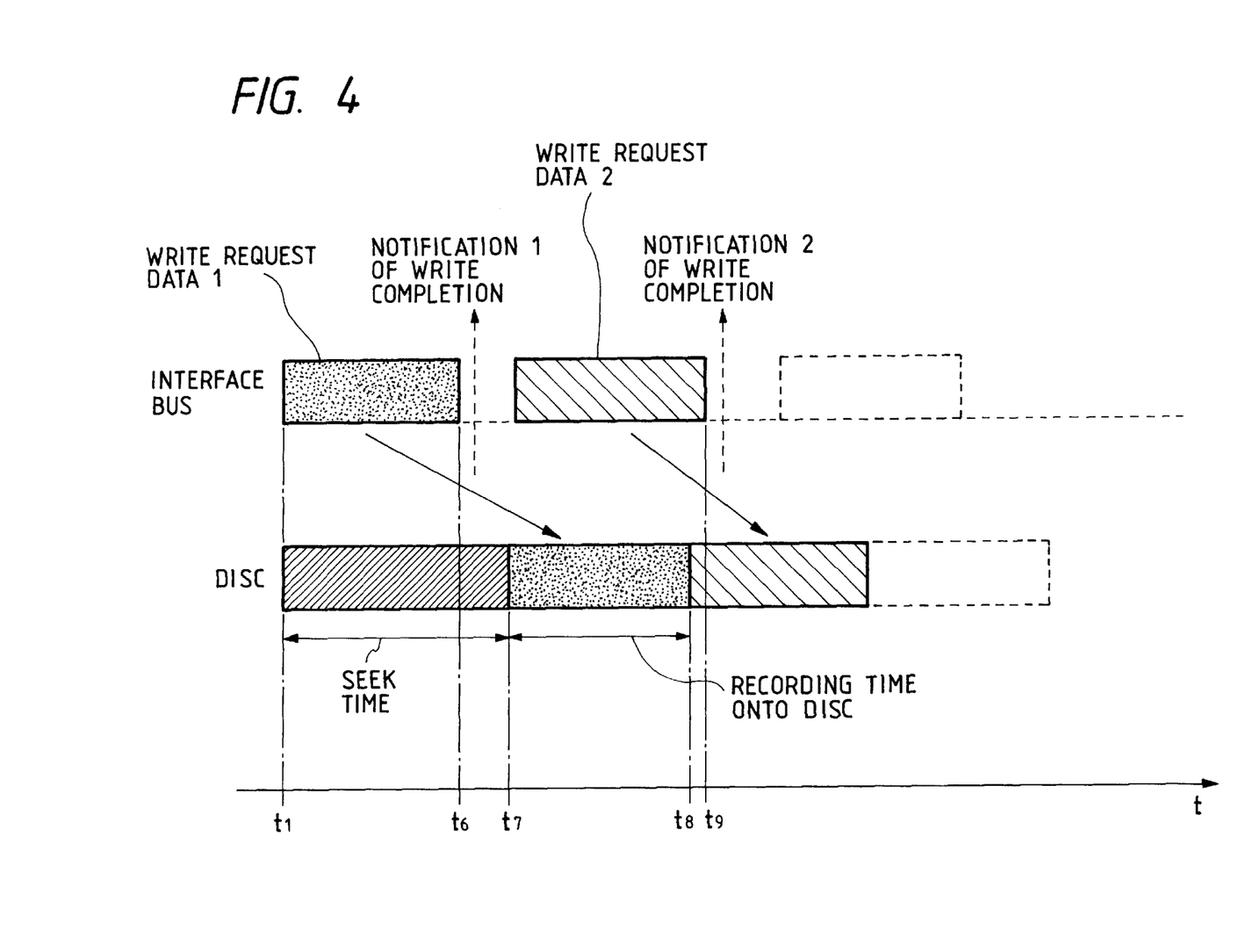
FIG. 4 is an explanatory view showing the time sequence of the information recording operation of the embodiment shown in FIG. 3.

The operation of this embodiment will be described below. FIG. 4 illustrates the outline of the operation of this embodiment, i.e., the time sequence of the state of an interface bus between the host computer 1 and the magneto-optical disc apparatus 2, and the access state to the disc of the magneto-optical disc apparatus 2. In FIG. 4, assume that the host computer 1 issues write request 1 from sector 0 to sector 3 on a track n, and write request 2 from sector 4 to sector 7 thereof, as in FIG. 2. At time $t_1$, the host computer 1 issues write request 1 to the magneto-optical disc apparatus 2, and starts data transfer. At the same time, the magneto-optical disc apparatus 2 seeks the recording/reproduction head to sector 0 on the target track n. The data transfer of write request 1 is completed at time $t_6$, and at this time, notification 1 of write completion is sent back to the host computer 2. Thus, the magneto-optical disc apparatus 2 is ready to accept the next request. The host computer 1 issues write request 2 after write request 1, and starts data transfer. More specifically, at this time, recording based on write request 1 is not completed, but write request 2 is issued subsequently.

On the other hand, the recording/reproduction head reaches sector 0 on the target track n at time $t_7$, and at this time, data of write request 1 begins to be recorded on the disc 5. Upon recording, recording of data of write request 1 from sector 0 to sector 3 is completed at time $t_8$, and subsequently, recording of data of write request 2 on sector 4 to sector 7 on the track n of the disc 5 is started. More specifically, at time $t_8$, data of write request 2 is already transferred from the host computer 1, and even when write request 2 is issued before completion of recording of data of write request 1, the data can be subsequently recorded on the disc 5. Upon completion of data transfer of write request 2 at time t₉, notification 2 of write completion is sent back to the host computer 1, and the disc apparatus is ready to accept the next request.

Figures 5, 5A:
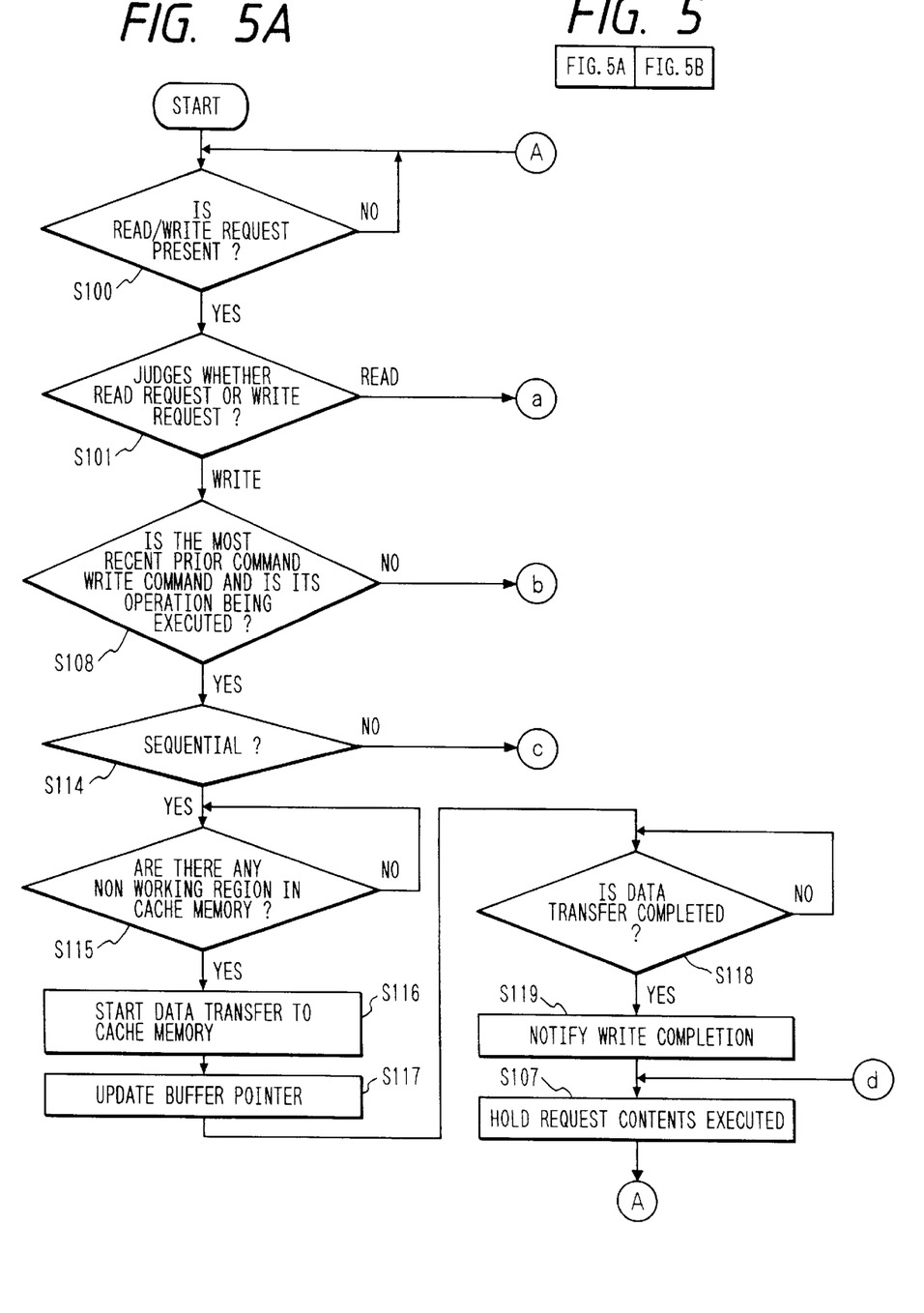
Figure 5B:
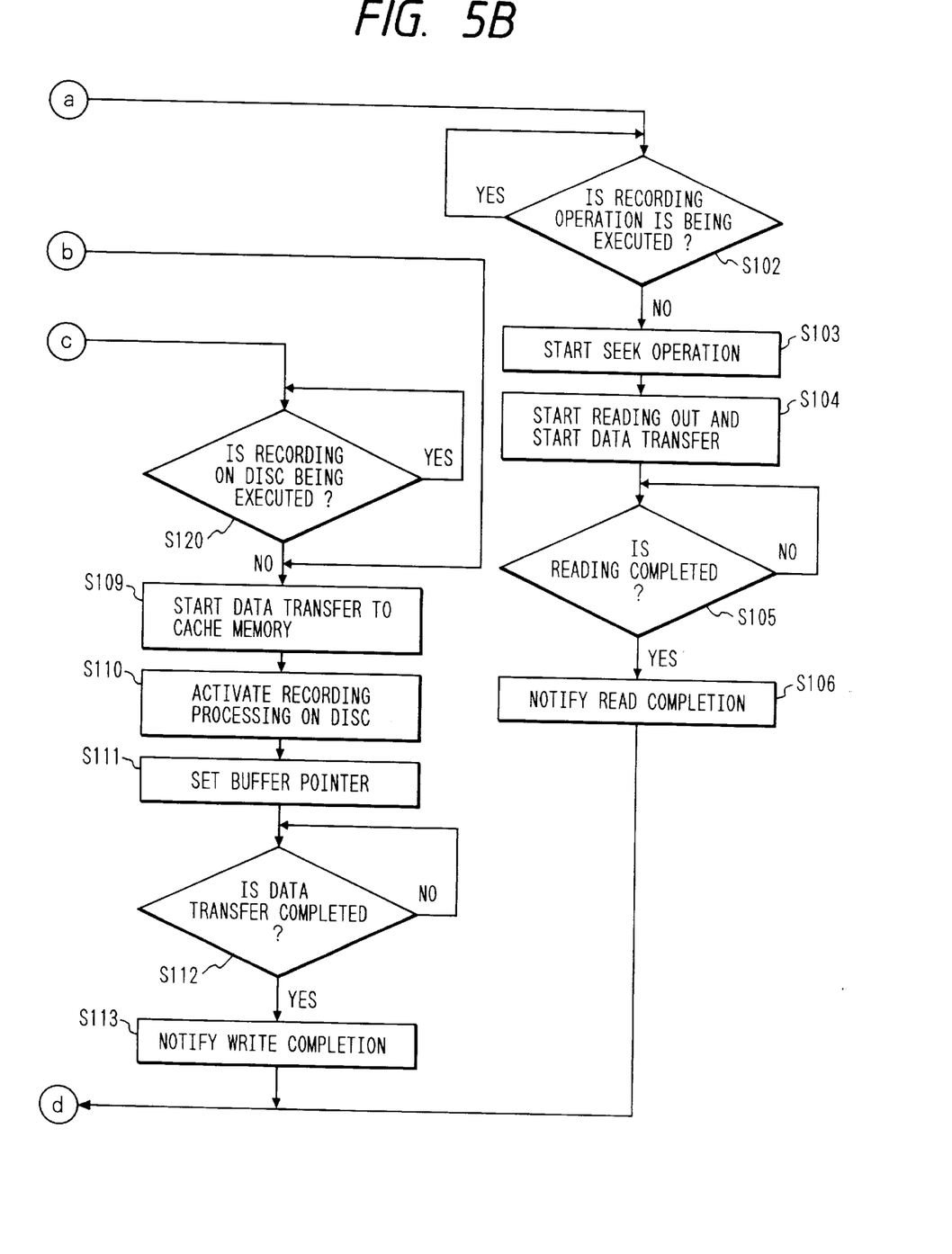

The outline of the operation has been described. The operation will be described in more detail below with reference to FIGS. 5A to 6. Command processing and data transfer processing with the host computer 1 will be explained below with reference to FIGS. 5A and 5B. Referring to FIGS. 5A and 5B, when the host computer 1 accesses the magneto-optical disc apparatus 2 (S100), the magneto-optical disc apparatus 2 checks the request, i.e., if the request is a read or write request (S101). If the request is a read request, it is checked if the recording operation to the disc 5 is being executed (S102). If YES in step S102, the control waits until the recording is completed. If NO in step S102, the seek operation of the recording/reproduction head to a target address is started (S103). When the head has reached the target address, data read from the address is started, and at the same time, transfer of the readout data is started (S104). It is then checked if all the requested data have been read out (S105). If YES in step S105, a notification of read completion is transferred to the host computer 1 (S106), thus ending processing for the read request. Upon completion of the data read access, the contents of the executed request are stored in the RAM 10 to prepare for the next request (S107).

On the other hand, if it is determined in step S101 that the request from the host computer 1 is a write request, it is checked if the most recent prior command from the host computer 1 is a write request and write processing for the command is being executed (S108). This judgment step is attained by looking up the contents stored in the RAM 10. If the most recent prior command is a read request, or write processing for the command has already been completed even if the command is a write request, transfer of data requested by the host computer 1 to the cache memory 7 is started (S109), and recording processing to the disc 5 is activated (S110). The recording processing will be described in detail later. Then, the buffer pointer is set, i.e., the CPU instructs the ODC 9 to transfer data to the R/W control unit 4, thus starting data recording on the disc 5 (S111). In this manner, data recording is started, and it is checked if transfer of the requested data to the cache memory 7 has been completed (S112). Upon completion of transfer of all the data, a notification of write completion is sent back to the host computer 1 (S113). Then, the execution contents for the request are stored in the RAM 10 to prepare for the next request (S107).

If it is determined in step S108 that the most recent prior command is a write command, and the write processing for the command is being executed, the current write request is compared with the prior write request to check if the current request is a sequential access to the prior request (S114). More specifically, this judgment step is attained by checking if the recording end address of the most recent prior request is continuous with the start address of the current write request, i.e., sequential write requests have been issued. Of course, since the RAM 10 stores the most recent prior request contents, and the recording end address of the prior request is obtained from the stored request contents, whether or not sequential write requests have been issued is determined by looking up the obtained recording end address.

If YES in step S114, it is checked if there is a non-working region in the cache memory 7 (S115). If YES in step S115, transfer of data for which recording is requested by the host computer 1 to the cache memory 7 is started (S116). Then, the buffer pointer is updated, i.e., commands are set in the ODC 9 to sequentially perform transfer of the currently requested data to the disc 5 immediately after the prior processing, thus starting data recording on the disc 5 immediately after the data recording of the prior request (S117). In this manner, the recording operation on the disc 5 is executed while storing the requested data from the host computer 1 in the cache memory 7. It is checked if transfer of the requested data to the cache memory 7 has been completed (S118). Upon completion of transfer of all the data, a notification of write completion is transferred to the host computer 1 (S119). Then, the executed request contents, i.e., management information such as the type of request, the start sector address and the number of sectors on the disc 5 of the data transferred to the cache memory 7 and the start address of the transferred data in the cache memory 7 if the request is a write request, and the like, are stored in the RAM 10 to prepare for the next request (Sl07).

On the other hand, if it is determined in step S114 that the current request is not a sequential write access, i.e., the start address of the current write request is not continuous with the end address of the prior write access, it is checked if data is being recorded on the disc 5 (S120). If YES in step S120, the control waits until the data recording is completed. Thereafter, as in the above description, a series of processing operations are executed, that is, transfer of the requested data to the cache memory 7 is started (S109), the recording processing on the disc 5 is activated (S110), the buffer pointer is set (S111), and so on. Upon completion of the transfer of the requested data to the cache memory 7, a notification of write completion is transferred to the host computer 1 (S113), and thereafter, the executed request contents are stored in the RAM 10 to prepare for the next request (S107).

The recording processing on the disc 5 will be described below with reference to FIG. 6. In this embodiment, as the recording method of the R/W control unit 4 of the magneto-optical disc apparatus 2, a 1-pass write method is adopted. In this method, the overwrite operation and the verification operation of the recorded result with respect to a single target recording sector are performed concurrently. More specifically, in the 1-pass write method, data can be recorded on a target recording sector by a single access. The recording processing on the disc to be described below is executed parallel to the data transfer processing described in FIGS. 5A and 5B. More specifically, the magneto-optical disc apparatus 2 has a software configuration which allows time-divisional execution of a plurality of tasks on a real-time monitor, and the data transfer processing task and the disc recording task independently execute their processing.

Figure 6:
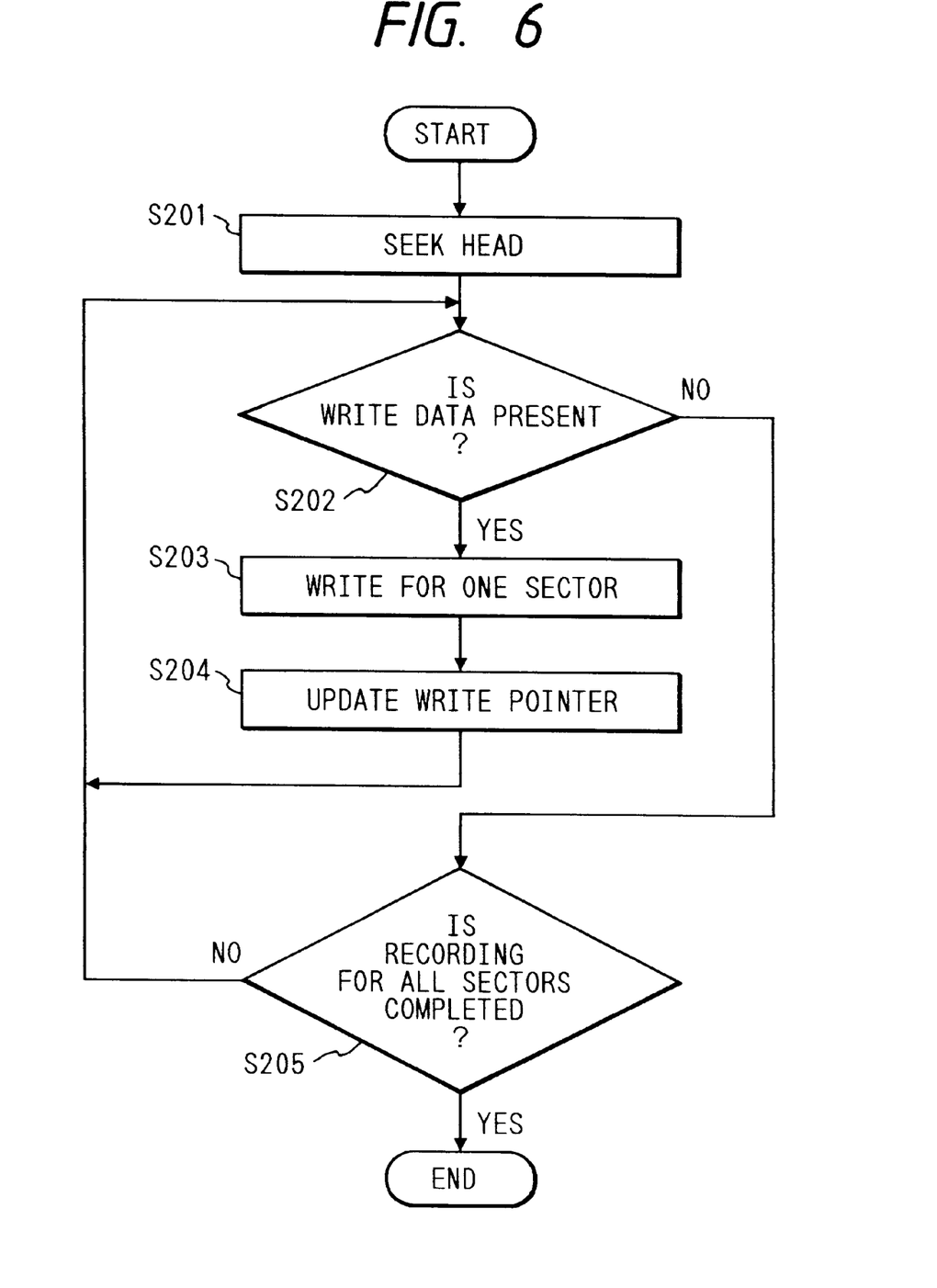
FIG. 6 is a flow chart showing the detailed information recording processing of the embodiment shown in FIG. 3.

Referring to FIG. 6, when the recording processing on the disc 5 is activated in step S110 in FIG. 5B, the seek operation of the recording/reproduction head to a target sector is performed (S201). Upon completion of the seek operation, it is checked if write data from the host computer 1 has already been transferred to the cache memory 7 (S202). If data for one sector in one write-requested data block has already been transferred to the cache memory 7, the data for one sector is recorded on the disc (S203), and the write pointer indicating the write position on the disc is updated (S204). The write pointer is stored in the RAM 10. The processing in steps S202 to S204 is repeated to record data in units of sectors. On the other hand, if it is determined in step S202 write-requested data is not present in the cache memory 7, it is checked if recording of data for all the sectors has been completed (S205). If NO in step S205, the processing in steps S202 to S205 is repeated, and the recording processing ends after the data for all the sectors are recorded.

In the above description of the embodiment, the recording processing in FIG. 6 is executed after the recording processing on the disc is activated in step S110 in FIG. 5B. Also, when information is recorded in step S117 in FIG. 5A, it is done according to the flow chart shown in FIG. 6. In this case, since a sequential write access is made, the seek operation in step S201 in FIG. 6 is not required. In addition, in this case, since the recording processing of the prior request is executing, and the recording processing has already been activated, activation of the recording processing in step S110 is not required.

As described above, in this embodiment, when the next write request is issued before completion of data recording corresponding to the prior write request from the host computer 1, if the prior and next write requests are sequential write accesses, data of the next write request is sequentially recorded after data of the prior write request. For this reason, the next requested data can be sequentially recorded after the prior requested data without requiring any rotation wait time of the disc 5. In particular, since a recent host computer has a high data transfer rate, requested data can be sequentially recorded after the prior write data without requiring any rotation wait time of the disc, and the recording speed can be effectively increased. In this case, the search processing of cache data need only check the continuity of addresses on the basis of the start sector address and the number of sectors stored in the RAM 10, and the updating processing need only update the number of sectors stored in the RAM 10, thus requiring no complicated processing unlike in the conventional write-back method.

Another embodiment of the present invention will be described below. In the above embodiment, the R/W control unit 4 of the magneto-optical disc apparatus 2 adopts the 1-pass write method as its recording method. However, in this embodiment, the R/W control unit 4 adopts a 2-pass write method. In the 2-pass write method, data recording and verification of the recorded result are not simultaneously performed, but after the overwrite operation is performed on a target recording sector, the recorded sector data is reproduced to inspect (i.e., verify) the recorded result. That is, the 2-pass write method requires two accesses to a target recording sector.

Figure 7:
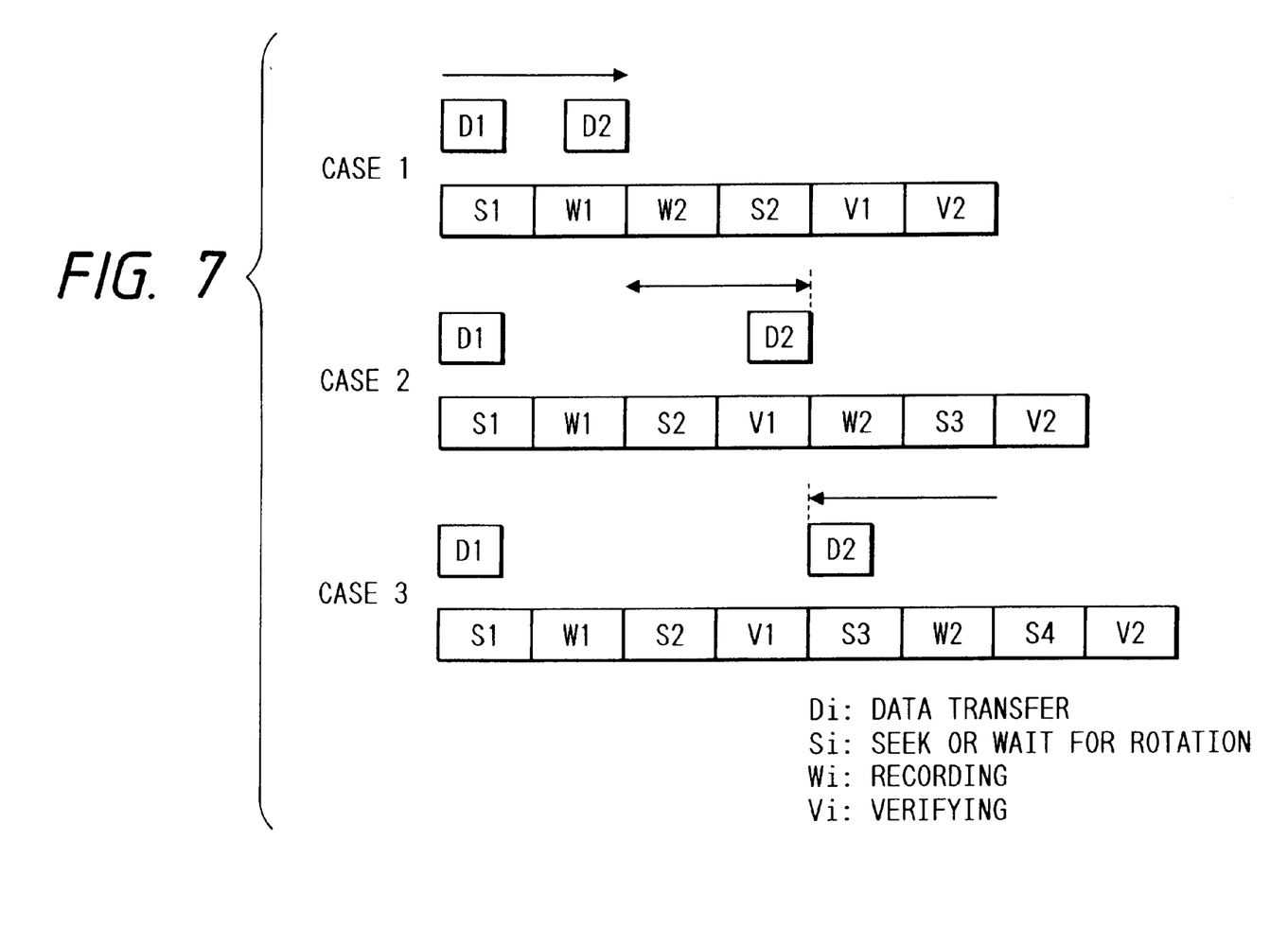
FIG. 7 is an explanatory view showing the time sequence of an information recording operation according to another embodiment of the present invention.

FIG. 7 illustrates the outline of the operation of this embodiment, i.e., shows the time sequence of the data transfer state from the host computer 1 to the magneto-optical disc apparatus 2 and the disc control state of the magneto-optical disc apparatus 2. In this embodiment, assume that the host computer 1 issues write request 1 from sector 0 to sector 3 on a track n, and write request 2 from sector 4 to sector 7 thereof, as in the above embodiment. In FIG. 7, Di represents the data transfer operation with the host computer 1, Si represents the seek operation or the wait state for rotation, Wi represents the recording operation on the disc, and Vi represents the verifying operation of the disc. Furthermore, since the time after execution of write request 1 until issuance of the next write request 2 varies depending on the state of the host computer 1, the description of the operation will be classified to cases 1 to 3 depending on the issuance timing of write request 2 and the data transfer end timing. In each of these cases, assume that a write request from the host computer 1 is accepted at the beginning of Di, and a notification of write completion is issued at the end of Di.

In case 1, data transfer (D2) of write request 2 is completed before completion of recording (W1) of data of write request 1. In this case, recording (W2) of data of write request 2 is sequentially performed after Wi, and thereafter, the head jumps to a position one track before (n–1track) (S2). Then, the recorded results of write requests 1 and 2 are verified (Vi and V2).

On the other hand, when data transfer (D2) of write request 2 is not completed before completion of recording (W1) of data of write request 1 on the disc, recording of data of write request 2 is not sequentially performed unlike in the first embodiment, since a write access is made in units of not sectors but data blocks (data corresponding to one command), as will be described later. That is, the head jumps to a position one track before (n–1 track) (S2), and the recorded result of write request 1 is verified (V1). In case 2, data transfer (D2) of write request 2 is completed before completion of V1. In this case, recording (W2) of data of write request 2 on the disc is sequentially performed after V1. Thereafter, the head jumps to a position one track before (n–1 track) (S3), and the recorded result of write request 2 is verified (V2). In case 3, data transfer of write request 2 is completed after completion of recording (W1) of data of write request 1 on the disc. In this case, an access to a target sector (S3), recording on the disc (W2), jumping to a position one track before (n–1 track) (S4), and verifying (V2) are executed in the same procedure as in a non-sequential write access.

Figure 8:
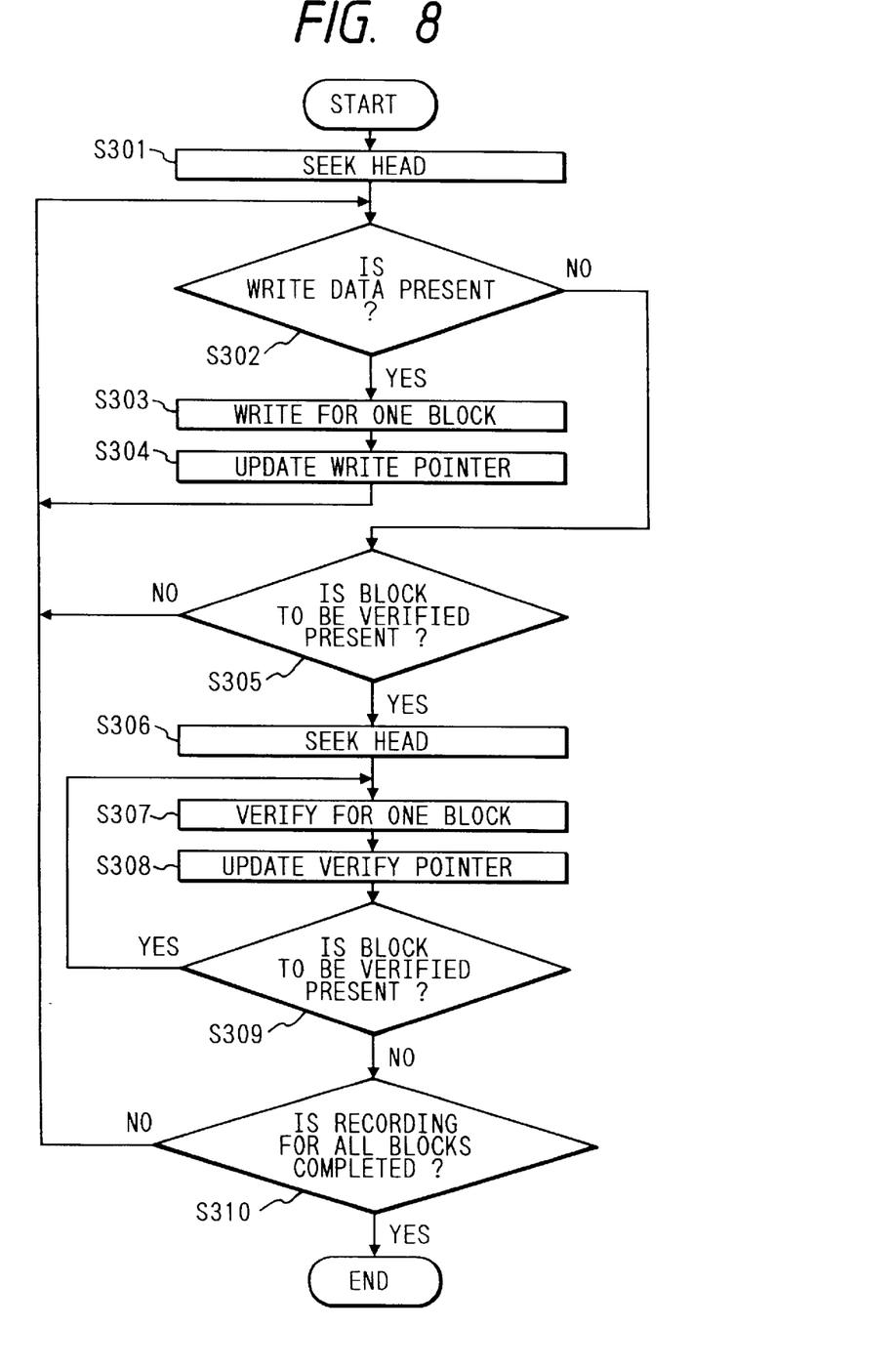
FIG. 8 is a flow chart showing the detailed information recording processing of the embodiment shown in FIG. 7.

The recording processing on the disc 5 according to this embodiment will be described below with reference to FIG. 8. Note that the command processing and the data transfer processing with the host computer 1 are the same as those in the above embodiment, as has been described above with reference to FIGS. 5A and 5B. Referring to FIG. 8, when the recording processing on the disc 5 is activated in step S110 in FIGS. 5A and 5B, the seek operation of the recording/reproduction head to a target sector is performed (S301). Upon completion of the seek operation, it is checked if write data from the host computer 1 has already been transferred to the cache memory 7 (S302). If one write-requested data block (to be simply referred to as a block hereinafter) has already been transferred to the cache memory 7, the one data block is recorded on the disc 5 (S303), and the write pointer in the RAM 10 indicating the write position on the disc 5 is updated (S304). The processing in steps S302 to S304 is repeated, and data is recorded in units of blocks.

If it is determined in step S302 that write-requested data is not present in the cache memory 7, it is checked if a block which has been recorded but is not verified yet is present (S305). If YES in step S305, the seek operation of the recording/reproduction head to the corresponding block is performed (S306) to verify the block (S307), and the verify pointer in the RAM 10 indicating the verifying position on the disc 5 is updated (S308). However, if NO in step S305, it is determined that requested data remains, and the processing in steps S302 to S305 is repeated to record the remaining data. It is then checked if a block which has been recorded but is not verified yet is present (S309). If YES in step S309, the processing in steps S307 to S309 is repeated to perform verification in units of blocks. On the other hand, if NO in step S309, it is checked if recording of all the write blocks is completed (S310). If NO in step S310, the processing in steps S302 to S310 is repeated, and when YES is determined in step S310, the recording processing ends.

In step S302, write data from the host computer is determined to have been transferred to the cache memory 7 is determined when all the data in the write-requested block have been transferred to the cache memory 7. However, in this case, all the data in the block need not always be transferred. For example, YES may be determined in step S302 when at least data for one sector has been transferred to the cache memory 7. More specifically, data in the cache memory 7 may be recorded on the disc 5 while transferring data from the host computer 1 to the cache memory 7 by the ODC 9. Therefore, in this case, even when the second or subsequent write request from the host computer 1 is slightly delayed, sequential recording processing can be attained.

In this embodiment, when the next write request is issued before completion of data recording corresponding to the prior write request from the host computer 1, if the prior and next write requests are sequential write accesses, data of the next write request is sequentially recorded after data of the prior write request. For this reason, data can be recorded without requiring any wasteful rotation wait time of the disc 5, as in the above embodiment. In this embodiment, when the next write request is issued before completion of data verification of the write request from the host computer 1, if the prior and next write requests are sequential accesses, data of the next write request is sequentially recorded after the data verifying operation of the prior write request. In this manner, the rotation wait time of the disc 5 can be minimized, and data can be efficiently recorded. In this case, as shown in case 2 in FIG. 7, the recording time is prolonged by the seek or rotation time S3 as compared to case 1. However, even in consideration of this, the total recording time can be shortened as compared to the prior art.

Figure 9:
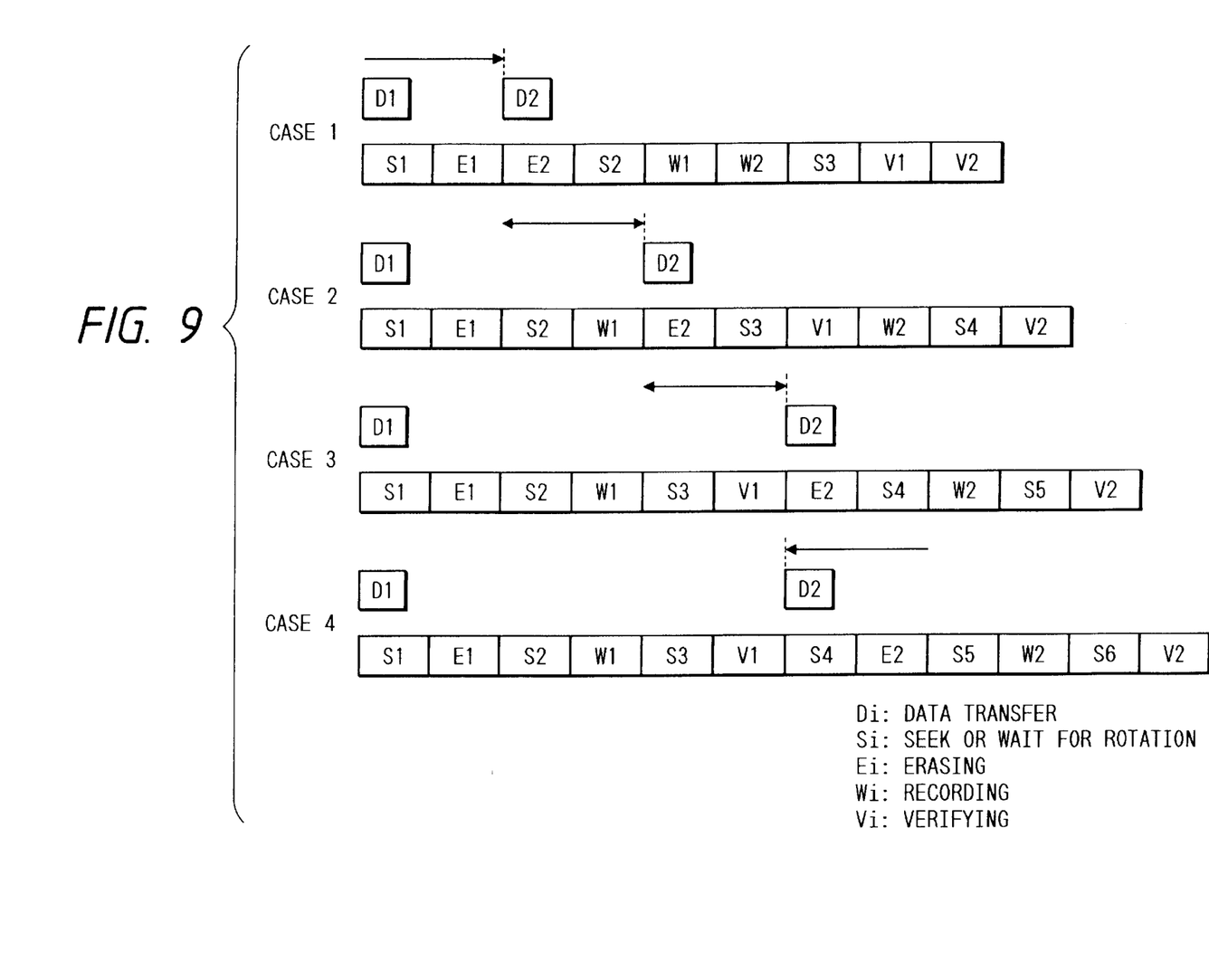
FIG. 9 is an explanatory view showing the time sequence of an information recording operation according to still another embodiment of the present invention.

Still another embodiment of the present invention will be described below. In this embodiment, the R/W control unit 4 of the magneto-optical disc apparatus 2 adopts a 3-pass write method as its recording method. The 3-pass write method cannot perform the overwrite operation in single data recording. That is, in this method, data on a target recording sector is erased in the first access, data is recorded on the erased sector in the second access, and thereafter, the recorded result is verified in the third access. More specifically, the 3-pass write method requires three accesses to a target recording sector. FIG. 9 illustrates the outline of the operation of this embodiments, i.e., shows the time sequence of the data transfer state from the host computer 1 to the magneto-optical disc apparatus 2 and the disc control state of the magneto-optical disc apparatus 2.

In this embodiment, assume that the host computer 1 issues write request 1 from sector 0 to sector 3 on a track n, and write request 2 from sector 4 to sector 7 thereof, as in the above embodiment. In FIG. 9, Di represents the data transfer operation with the host computer 1, Si represents the seek operation or the wait state for rotation, Ei represents the erasing of the disc, Wi represents the recording operation on the disc, and Vi represents the verifying operation of the disc. Furthermore, since the time after execution of write request 1 until issuance of the next write request 2 varies depending on the state of the host computer 1, the description of the operation will be classified to cases 1 to 4 depending on the issuance timing of write request 2. In each of these cases, assume that a write request from the host computer 1 is accepted at the beginning of Di, and a notification of write completion is issued at the end of Di.

Case 1 exemplifies the operation when write request 2 (D2) is issued before completion of erasing (E1) of the disc for write request 1. At this time, erasing (E2) of the disc for write request 2 is sequentially performed after E1. Thereafter, the head jumps to a position one track before (n–1 track) (S2), and recording of data of write requests 1 and 2 on the disc is executed (W1 and W2). The head jumps to the position one track before (n–1 track) (S3), and the recorded results of write requests 1 and 2 are verified (V1 and V2).

When write request 2 (D2) is not issued before completion of erasing (E1) of the disc for write request 1, since erasing for write request 2 cannot be executed sequentially, the head jumps to the position one track before (n–1 track) (S2), and executes recording of data of write request 1 (W1). In case 2, write request 2 (D2) is issued before completion of W1. In this case, erasing (E2) of the disc for write request 2 is sequentially executed after W1, the head jumps to the position one track before (n–1 track) (S3), and verifying (V1) of the recorded result of write request 1 and recording (W2) of data of write request 2 are sequentially executed. Finally, the head jumps to the position one track before (n–1 track) (S4), and the recorded result of write request 2 is verified (V2).

Furthermore, when write request 2 (D2) is not issued before completion of Wi, since erasing for write request 2 cannot be sequentially executed, the head jumps to the position one track before (n–1 track) (S3), and the recorded result of write request 1 is verified (V1). In case 3, write request 2 (D2) is issued before completion of V1. In this case, erasing (E2) of the disc for write request 2 is sequentially performed after V1, the head jumps to the position one track before (n–1 track) (S4), and recording (W2) of data of write request 2 is executed. Finally, the head jumps to the position one track before (n–1 track) (S5), and the recorded result of write request 2 is verified (V2). In case 4, write request 2 (D2) is not issued before completion of V1. In this case, an access to a target sector (S4), erasing of the disc (E2), jumping to the position one track before (n–1 track) (S5), recording on the disc (W2), jumping to the position one track before (n–1 track) (S6), and verifying (V2) are executed in the same procedure as in a non-sequential write request.

Figure 10:
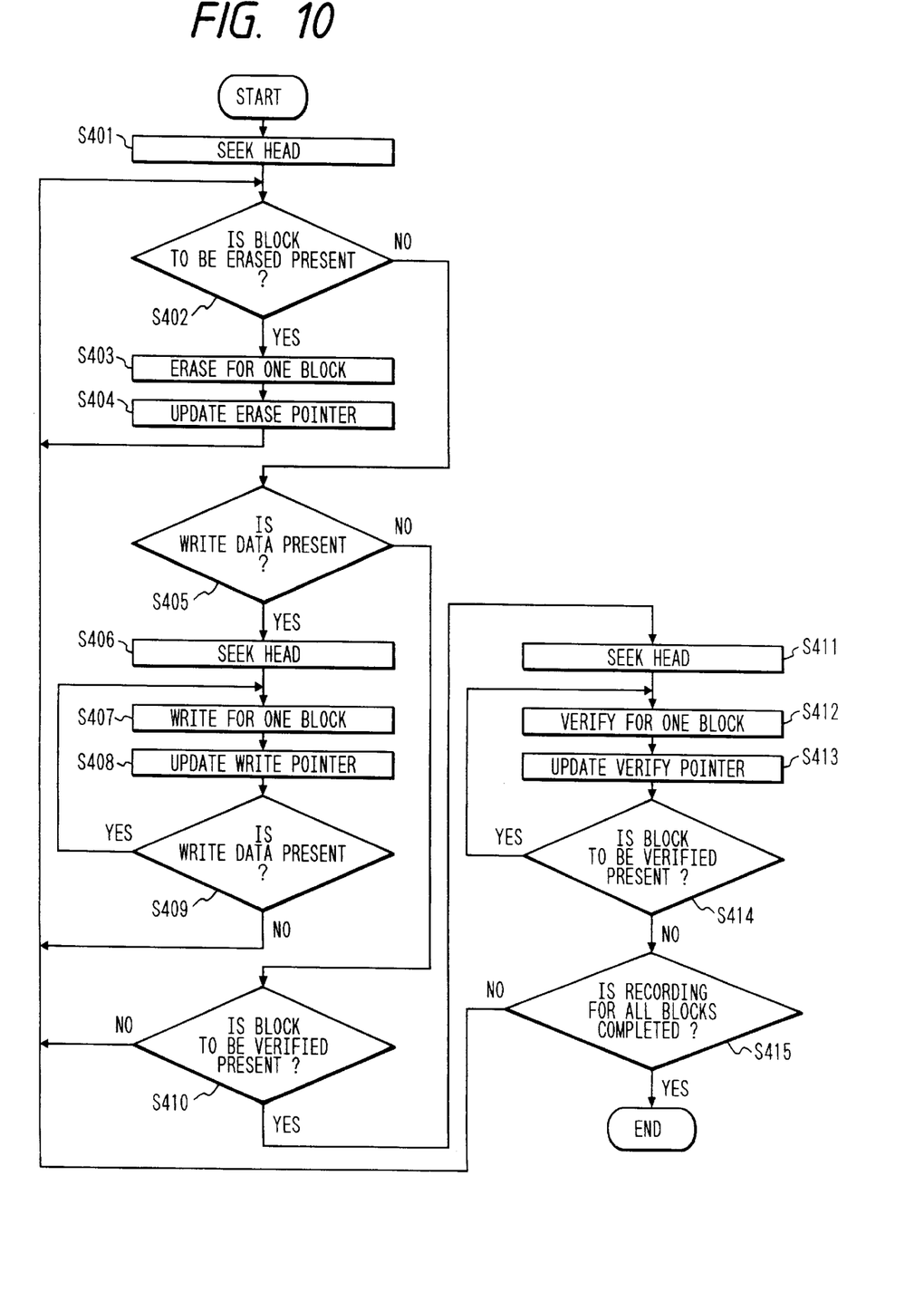
FIG. 10 is a flow chart showing the detailed information recording processing of the embodiment shown in FIG. 9.

The recording processing on the disc 5 according to this embodiment will be described below with reference to FIG. 10. Note that the command processing and the data transfer processing with the host computer 1 are also the same as those in the above embodiment, as has been described above with reference to FIGS. 5A and 5B. Referring to FIG. 10, when the recording processing on the disc 5 is activated in step S110 in FIGS. 5A and 5B, the seek operation of the recording/reproduction head to a target sector is performed (S401). Upon completion of the seek operation, it is checked if a block which corresponds to a received write request but is not erased yet (erase block) is present (S402). If YES in step S402, one block as a write request unit is erased (S403), and the erase pointer in the RAM 10 indicating the erasing position on the disc is updated (S404). The processing in steps S402 to S404 is repeated to perform erasing in units of blocks. On the other hand, if NO in step S402, it is checked if write data from the host computer 1 has already been transferred to the cache memory 7 (S405).

If one write-requested data block has already been transferred to the cache memory 7, the seek operation of the recording/reproduction head to a target sector is performed (S406). Upon completion of the seek operation, data for one block is recorded on the disc (S407). Then, the write pointer in the RAM 10 indicating the write position on the disc 5 is updated (S408), and it is then checked again if data for one block has already been transferred to the cache memory 7 (S409). If YES in step S409, the flow returns to step S407, and the processing in steps S407 to S409 is repeated to record data in units of blocks. In this manner, data is recorded, and if it is determined in step S409 that data is not present in the cache memory 7, it is determined that write data remains. The flow then returns to step S402, and the processing in steps S402 to S404 is repeated to erase a block to be erased. If it is determined in step S405 that data is not present in the cache memory 7, the flow enters the verifying routine, and it is checked if a block which has been recorded but is not verified is present (S410).

If NO in step S410, it is determined that a data block to be recorded remains, and the processing from step S402 is repeated; otherwise, the seek operation of the recording/reproduction head to the start position of the block is performed (S411) to verify the block (S412). Then, the verify pointer in the RAM 10 indicating the verifying position on the disc 5 is updated (S413), and it is then checked if a block to be verified remains (S414). If YES in step S414, the processing in steps S412 to S414 is repeated to perform verifying in units of blocks. Thereafter, when NO is determined in step S414, it is checked if data in all the blocks have been recorded (S415). If NO in step S415, the flow returns to step S402 to repeat the same processing as above. After data in all the blocks are recorded, the recording processing ends.

As described above, in this embodiment, when the next write request is issued before completion of the erasing operation for the prior write request from the host computer 1, if the next and prior write requests are sequential accesses, the erasing operation for the next write request is sequentially performed after the erasing operation of the prior write request. For this reason, since the erasing, recording, and verifying operations of the prior and next write requests can be sequentially executed, data can be efficiently recorded with a minimum rotation wait time of the disc 5. On the other hand, when the next write request is issued before completion of data recording of the prior write request from the host computer 1, the erasing operation of the next write request is sequentially performed after the data recording of the prior write request. In this manner, data can be similarly recorded on the disc 5 efficiently. In this case, the recording time is prolonged by the seek or rotation time S4 as compared to case 1 in FIG. 9. However, even in consideration of this, the execution time of data recording can be shortened as compared to the prior art.

Furthermore, in this embodiment, when the next write request is issued before completion of the verifying operation for the prior write request from the host computer 1, the erasing operation of the next write request is sequentially performed after the verifying operation of the prior write request. In this manner, data can be similarly recorded on the disc 5 efficiently. In this case, the recording time is prolonged by the seek or rotation time S5 as compared to case 2 in FIG. 9. However, the execution time of data recording can be shortened as compared to the prior art.

In the above embodiment, the 3-pass write method has been exemplified. As a modification of this embodiment, the present invention may be applied to a 2-pass write method in which data is not verified. More specifically, even when data is recorded in two accesses, i.e., an access for erasing a data block and an access for recording data (without executing verifying), when the next write request is issued before completion of the erasing operation for the prior write request from the host computer 1, the erasing operation of the next write request is sequentially executed after the erasing operation of the prior write access, thus similarly allowing efficient recording of data. On the other hand, when the next write access is issued before completion of data recording of the prior write request from the host computer 1, the erasing operation of the next write request is sequentially executed after the data recording of the prior write access, thus similarly allowing efficient recording of data.

In each of the above embodiments, a magneto-optical disc apparatus has been exemplified as an information recording apparatus. However, the present invention is not limited to this. For example, the present invention may be applied to a magnetic disc apparatus, an optical disc apparatus, an information recording apparatus using a card-like recording medium such as an optical card, and the like.

As described above, the present invention can provide the following effects.

(1) When the next write request is issued before completion of information recording of the prior write request from the host computer, information of the next write request is sequentially recorded after the information recording of the prior write request. In this manner, information can be recorded without requiring any wait time upon movement of a recording medium, and the information recording time can be greatly shortened as compared to the prior art.

(2) When the next write request is issued before completion of the verifying operation of the recorded information of the prior write request from the host computer, information of the next write request is sequentially recorded after the verifying operation of the recorded information of the prior write request. In this manner, the wait time upon movement of the recording medium can be minimized, and information can be efficiently recorded. Therefore, a wasteful wait time upon movement of the recording medium can be eliminated, and the information recording time can be shortened.

(3) When the next write request is issued before completion of the erasing operation of the prior write request from the host computer, the erasing operation of the next write request is sequentially performed after the erasing operation of the prior write request. In this manner, since a wasteful wait time upon movement of the recording medium can be similarly eliminated, information can be recorded efficiently, and the information recording time can be shortened.

(4) When the next write request is issued before completion of information recording of the prior write request from the host computer, the erasing operation of the next write request is sequentially performed after the information recording of the prior write request. In this manner, information can be similarly recorded efficiently, and the information recording time can be shortened.

(5) When the next write request is issued before completion of the verifying operation of the recorded information of the prior write request from the host computer, the erasing operation of the next write request is sequentially performed after the verifying operation of the recorded information of the prior write request. In this manner, information can be similarly recorded efficiently, and the information recording time can be shortened.

(6) Therefore, in any of the 1-, 2-, and 3-pass write methods, a wasteful wait time upon movement of a recording medium can be eliminated, and sequential processing can be performed. For this reason, the information recording time can be shortened as compared to the prior art.

(7) Since the searching processing of cache data upon issuance of a read/write command need only check the continuity of addresses, and the updating processing need only update the number of sectors, the searching processing and updating processing of management information of a plurality of cache data are not required unlike in the conventional write-back method. For this reason, the execution times of write and read requests can be shortened.

What is claimed is:

1. An information recording apparatus, comprising:

a cache memory for storing recording information transferred from a host computer and recording means for recording the recording information on a recording medium, and in which, upon reception of a write request from the host computer, recording information from the host computer is recorded onto the recording medium by said recording means simultaneously with storing of the recording information in said cache memory, and the host computer is notified of end of writing to be ready for receiving a next request after completion of storing of the recording information in said cache memory; and judging means for comparing a request from the host computer with a most recent prior request to judge if two requests are concerned with sequential writing, wherein, in response to the judgment by said judging means, when the two requests are concerned with sequential writing, recording information related to the next write request is immediately stored in said cache memory, and when the two requests are not concerned with sequential writing, the recording information related to the next write request is stored in said cache memory after completing a writing operation corresponding to the most recent prior request.

2. An apparatus according to claim 1, wherein the writing operation consists of write and verify processes, and when the host computer issues a sequential write request during the write process of the most recent prior writing operation, not the verify process of the most recent prior writing operation but the write process corresponding to the next write request is sequentially performed after completion of the write process of the most recent prior writing operation.

3. An apparatus according to claim 1, wherein the writing operation consists of write and verify processes, and when the host computer issues a sequential write request during the verify process of the most recent prior writing operation, the write process corresponding to the next write request is sequentially performed after completion of the verify process of the most recent prior writing operation.

4. An apparatus according to claim 1, wherein the writing operation consists of erase, write, and verify processes, and when the host computer issues a sequential write request during the erase process of the most recent prior writing operation, not the write process of the most recent prior writing operation but the erase process corresponding to the next write request is sequentially performed after completion of the erase process of the most recent prior writing operation.

5. An apparatus according to claim 1, wherein the writing operation consists of erase, write, and verify processes, and when the host computer issues a sequential write request during the write process of the most recent prior writing operation, not the verify process of the most recent prior writing operation but the erase process corresponding to the next write request is sequentially performed after completion of the writing process of the most recent prior write operation.

6. An apparatus according to claim 1, wherein the writing operation consists of erase, write, and verify processes, and when the host computer issues a sequential write request during the verify process of the most recent prior writing operation, the write process corresponding to the next write request is sequentially performed after completion of the verify process of the most recent prior writing operation.

7. An apparatus according to claim 1, wherein, when said judging means determines that the two requests are concerned with sequential writing, the writing operation corresponding to the most recent prior write request and the writing operation corresponding to the next write request are sequentially executed without address confirmation.

8. An information recording method, in which upon reception of a write request from a host computer, recording information from the host computer recording information from the host computer is recorded onto the recording medium by said recording means simultaneously with storing of the recording information in a cache memory, and after completion of storing of the recording information in the cache memory, the host computer is notified of end of writing, to be ready to accept the next request, said method comprising:

the judging step of comparing a request from the host computer with a most recent prior request to judge if two requests are concerned with sequential writing; and the step of, in response to a judgment result obtained in said judging step, immediately storing into the cache memory recording information related to the next write request after completing a writing operation corresponding to the most recent prior request when the two requests are not concerned with sequential writing.

* * * * *

UNITED STATES PATENT AND TRADEMARK OFFICE
CERTIFICATE OF CORRECTION

PATENT NO. : 5,937,427
DATED : August 10, 1999
INVENTOR(S) : Tatsuo Shinagawa et al.

It is certified that error appears in the above-identified patent and that said Letters Patent is hereby corrected as shown below:

COLUMN 6
   Line 62, "S202" should read --S202 that--.

COLUMN 14
   Line 25, "recording" should be deleted;
   Line 26, "information from the host computer" should be deleted.

Signed and Sealed this

Thirty-first Day of October, 2000

Attest:

Q. TODD DICKINSON

Attesting Officer

Director of Patents and Trademarks